United States Patent [19]
Ito

[11] Patent Number: 4,629,237
[45] Date of Patent: Dec. 16, 1986

[54] PARALLEL TYPE ROBOT CHUCK
[75] Inventor: Takeshi Ito, Nagano, Japan
[73] Assignee: Machine Engineering Co., Ltd., Nagano, Japan
[21] Appl. No.: 739,261
[22] Filed: May 30, 1985
[30] Foreign Application Priority Data May 30, 1984 [JP] Japan .................................. 59-110426
Sep. 19, 1984 [JP] Japan .................................. 59-195968

[51] Int. Cl.⁴ .............................................. B25J 15/08
[52] U.S. Cl. ................................... 294/88; 294/119.1; 901/37
[58] Field of Search ...................... 294/86.4, 88, 93, 94, 294/103.1, 115, 116, 119.1; 269/32, 34, 256; 901/30-39

[56] References Cited
U.S. PATENT DOCUMENTS 3,170,322 2/1965 Cavanaugh ....................... 294/88 X
4,518,187 5/1985 Blatt et al. .................... 294/119.1 X

FOREIGN PATENT DOCUMENTS 595112 8/1957 Italy .................................. 294/119.1
981184 12/1982 U.S.S.R. .............................. 294/116
1034894 8/1983 U.S.S.R. ................................ 901/36

Primary Examiner—Johnny D. Cherry
Attorney, Agent, or Firm—Sughrue, Mion, Zinn Macpeak & Seas

[57] ABSTRACT

A chuck for a robot or the like of a parallel opening/closing type. A piston is slidably supported in a cylinder, slidable in a first direction. A pair of slide pawls are slidably mounted so as to be movable in a second direction, perpendicular to the first direction, for performing opening/closing movement. The pawls are biased in the opening direction. A pair of action levers are rotatably supported on the cylinder, abutting an end of the piston and engaging with respective ones of the pawls. A pair of shafts are provided on the cylinder for guiding fulcrums of the action levers and the slide pawls. Each of the pawls has a reference portion projecting upwardly, two elongated holes, and a slot portion at a center portion thereof for receiving corresponding ones of the action levers. The reference portion of one of the slide pawls, the action levers, and the reference portion of the other one of the slide pawls are supported side by side on these shafts.

8 Claims, 25 Drawing Figures

PARALLEL TYPE ROBOT CHUCK

BACKGROUND OF THE INVENTION

The present invention relates to a chuck used for a device or a robot for feeding and/or discharging parts, particularly, to a chuck in which a pair of pawls are opened/closed using a parallel movement.

Rotary pawl type chucks are widely used with robots or the like because of their simple structure; however, chucks in which the opening/closing movement takes place in a parallel manner (hereinafter referred to as a "parallel chuck") is also used because of its reliability in grasping.

The parallel chuck, having a pair of pawls reciprocatively guided by guiding bars or slide grooves, has disadvantages, however, that its structure is complicated, its size is large for its function, its ease of assembly is poor, torsion may arise depending on the way force is applied, etc.

SUMMARY OF THE INVENTION

It is an object of the present invention to eliminate the aforementioned disadvantages in the conventional parallel chuck, to made the chuck small in size, light in weight, simple in structure, to improve the same in ease of assembly, and to permit the parallel chuck to be driven in opposite directions.

To attain the aforegoing objects of the present invention, to reduce the number of parts, slide pawls are guide by shafts and surfaces, fulcrums are spaced therebetween so as to make them common to the guide shafts, and reference portions of the respective pawls are biased to reduce the assembly space.

Specifically, a parallel chuck of the invention comprises a pressing member supported by a body and slidable in a first direction, a pair of slide pawls facing each other and openable/closable in a direction crossing the first direction, a spring for urging the slide pawls away from one another, action members rotatably supported by the body and abutting the pressing member and the respective corresponding slide pawls for transmitting displacements of the pressing member to the respective slide pawls, and two shafts provided in the body for guiding respective fulcrums of the action members and the slide pawls on which each of the pawls has a reference portion upwardly projecting in a baised manner and two elongated holes and a slot portion at a center portion for receiving a corresponding one of the action members, whereby the reference portion of one of the slide pawls, the action members, and the reference portion of the other one of the slide pawls are supported side by side on the shafts.

Further, the arrangement described above can be modified by omitting the spring and providing a biasing member supported by the body slidably in the first direction for urging the slide pawls towards their open position, action levers rotatably supported by the body and abutting on the widening member and the respective corresponding slide pawls for transmitting displacements of the pressing member and the widening member to the respective corresponding slide pawls, and two shafts provided on the body for guiding respective fulcrums of the action levers and the slide pawls, each of the pawls having a reference portion projecting upwardly in a biased manner and two elongated holes and a slot portion at a center portion for receiving a corresponding one of the action levers, the reference portion of one of the slide pawls, the action levers, and the reference portion of the other one of the slide pawls being supported side by side by the shafts, thereby forming a parallel chuck of the reciprocating type adapted to be driven in opposite directions. Further, the pressing member and the biasing member can be provided in the form of a piston so that they can be subjected to fluid control, and the pawls guided through bearings to make their operations smooth.

BRIEF DESCRIPTION OF THE DRAWINGS

FIGS. 5, 5a and 5b are, respectively, a front view and a side view of parts of a cylinder seen in FIG. 1;

FIGS. 6, 6a and 6b are, respectively, front view and a side view of parts of slide pawls seen in FIG. 1;

FIGS. 8, 8a and 8b are, respectively, front view and a side view of parts of the piston;

DESCRIPTION OF THE PREFERRED EMBODIMENTS

Figure 1:
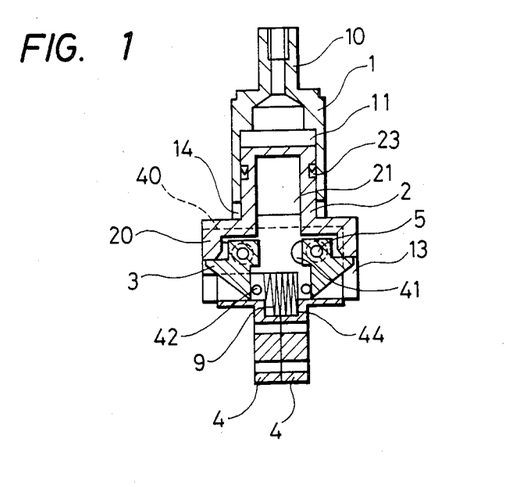
FIG. 1 is a cross-sectional view of a chuck of a first embodiment of the present invention showing the state in which the chuck is closed.
Figure 2:
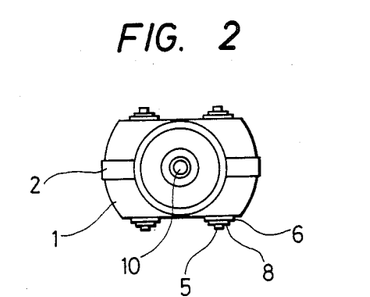
FIG. 2 is a plan view of the same.
Figure 3:
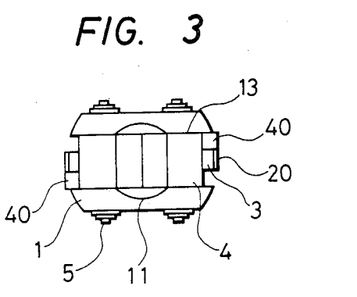
FIG. 3 is a bottom view of the same.

Referring to the drawings, a preferred embodiment of the present invention will be described. A piston 2 is slidably fitted into a lower opening of a center hole 11 forming a cylindrical chamber of a cylinder 1 having a fluid path 10. A seal 23 is fitted into a groove 22 of the piston 2. At the lower portion of the piston, pressing portions 20 extending sidewardly in opposite directions and bent downwardly are fitted into respective recessed guide faces 14 to thereby prevent them from rotating and to guide them vertically (in a first direction), as shown in FIG. 1. The center hole 21 of the piston 2 is hollow for reducing the weight of the assembly.

At the lower portion of the cylinder 1 a wide slot 12 is formed in which action members 3 and slide pawls 4 (described in detail below) are received, and side surfaces 13 guide respective ones of the slide pawls 4. Holes 15 are formed in the cylinder 1 on opposite sides of the slot 12. Shafts 5 pass through the holes 15, and sleeves 6 are fitted around the shafts 5, prevented from coming off the shaft 5 by E-rings 8 at the opposite ends thereof.

Figure 4:
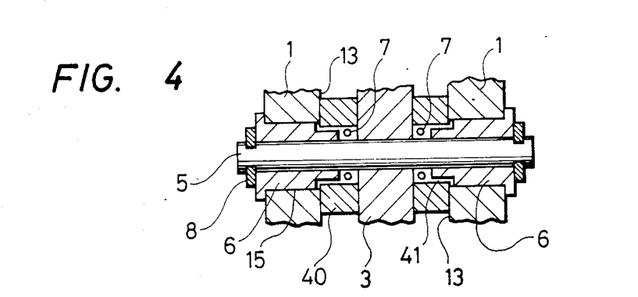
FIG. 4 shows a cross section of the shaft portion.
Figure 5A:
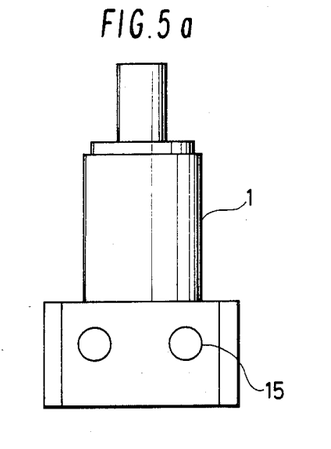
Figure 5B:
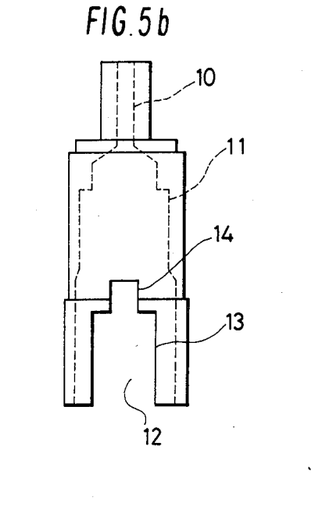
Figure 6A:
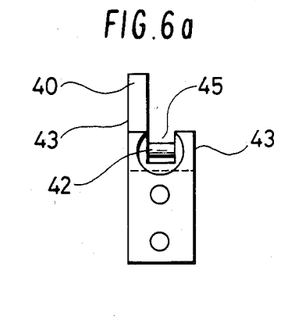
Figure 6B:
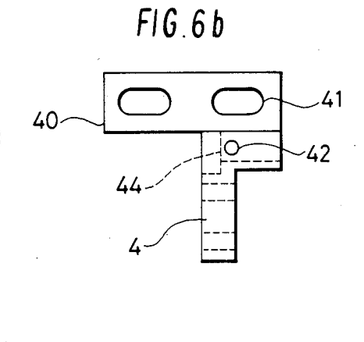
Figure 7:
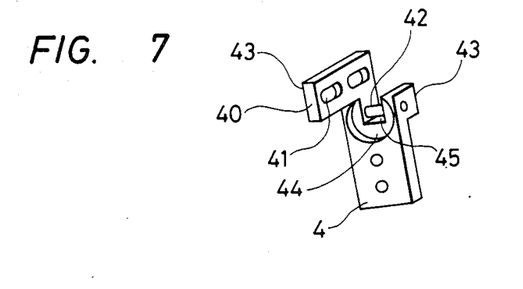
FIG. 7 is an outline diagram of the slide pawls.
Figure 8A:
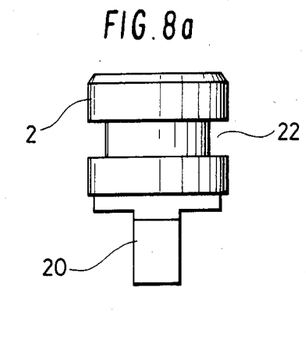
Figure 8B:
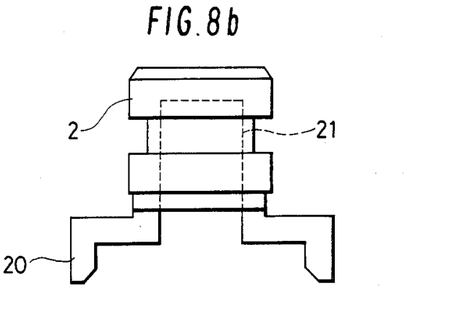

The action members 3 are rotatably fitted onto respective ones of the shafts 5. Elongated guide holes 41 formed in each of reference members 40 of the respective slide pawls 4 are slidably fitted onto the shafts 5 through bearings 7 at both sides of the respective action members 3 (see FIG. 4). Each of the action members 3 is substantially triangularly shaped, with one end abutting the pressing member 20 and the other end abutting a pin 42 of the corresponding slide pawl 4.

A slot portion 45 having the same width as the action member 3 is formed at an upper center portion of each of the slide pawls 4, and a pin 42 is supported thereat. At the side upper portion of each slide pawl 4 is formed a biased reference member 40 in which the two guide holes 41, elongated in the sliding direction, are formed at the same interval as the spacing of the shafts 5. A biasing spring 9 for urging the slide pawls 4 apart from one another is fitted at its opposite ends into the counterbores 44 of the respective pawls.

The left and right slide pawls 4, which are commonly shaped, are arranged such that the reference members 40 are engaged with each other through the respective slot portions 45 at the opposite sides to constitute a set of opening/closing pawls when the counterbores 44 are set in opposition to each other (by rotation through 180 degrees). Each of the action members 3 is rotatably mounted in a corresponding slot portion 45, and the other end of each action member 3 abuts the pin 42 so that the force of the spring 9 acts on the piston 2 through the pin 42 and the action member 3 to normally lift the piston with the slide pawls 4 opened widely therebetween.

In operation normally, the slide pawls 4 are opened by the force of the spring 9, and the piston 2 is advanced in the first direction by compressed air or the like. As the piston 2 advances, the pressing members 20 cause the respective action members 3 to rotate to thereby push the pins 42. Therefore, the slide pawls 4 are guided by the respective bearings 7 fitted on the shafts 5, and the slide surfaces 43 are guided by the respective side surfaces 13 so that the pawls are closed in the direction of the elongated guide holes 41 (in a direction crossing the first direction) to thereby grasp an object. When the fluid pressure is thereafter released, the pawls 4 are opened by the force of the spring 9.

Finger members (not shown) for grasping the object are fixed to the slide pawls 4.

Although a cylinder and a piston are used in the above-described embodiment, an arrangement may alternatively be used wherein the pressing members are advanced by a solenoid, a motor, or the like, into a body substituted for the cylinder. Morevoer, although the shafts 5 are fitted into bearings to guide the elongated holes 41 of the slide pawls in the above-described embodiment, it will suffice to cause the shafts 5 to directly guide the elongated holes 41.

With reference to FIGS. 9 to 16b of the drawings, another embodiment of the present invention will be described.

A cylinder 100 having fluid paths 110 and 190 has a lower opening (center hole) constituting cylinder chambers 130, 170, and 180 which are reduced in diameter in the stated sequence. A piston 200 for performing a closing function is slidably fitted in the cylinder chamber 130. The cylinder chamber 170 is communicated with the fluid path 110, and at an outside portion of the chamber 170, there is formed a planar portion 120 (FIG. 10) where the cylinder is coupled to a pipe (not shown) with a seal therebetween. A stepped-diameter piston 900 is slidably fitted into the cylinder chamber 180, and the upper portion of the chamber is communicated with the fluid path 190.

Figure 9:
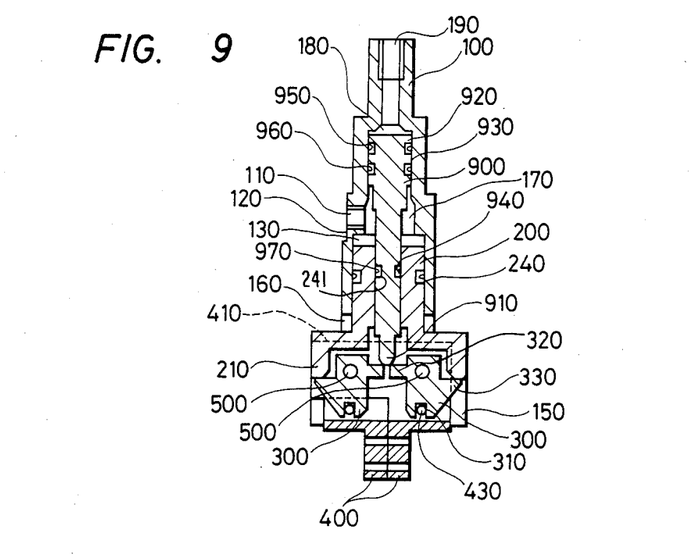
FIG. 9 is a cross-sectional view of a second embodiment of a chuck of the present invention showing the state in which the chuck is closed.
Figure 10:
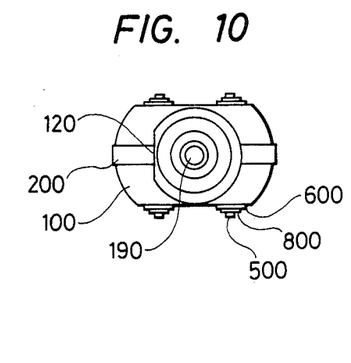
FIG. 10 is a plan view of the same.
Figure 11:
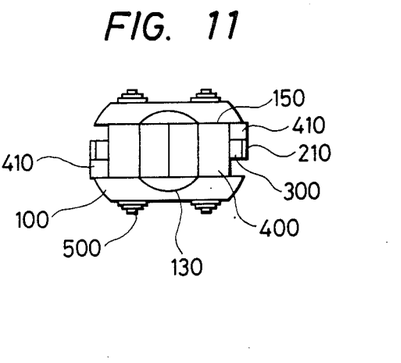
FIG. 11 is a bottom view of the same.

A V-shaped packing 240 is fitted into a groove 241 of the closing piston 200. At the lower portion of the piston, pressing portions 210, which extend sidewardly in opposite directions and which are bent downwardly, are fitted into recessed guide faces 160 to thereby be prevented from rotating, and are guided vertically (in the first direction), as seen in FIG. 9. V-shaped packings 950, 960, and 970 are fitted into grooves 920, 930, and 940 of the piston 900. The center hole 220 is hollow for reducing the weight of the assembly.

At the lower portion of the cylinder 100 wide slots 140 are formed which receive action levers 300 and slide pawls 400. Side surfaces 150 guide respective ones of the slide pawls 400.

Figure 12:
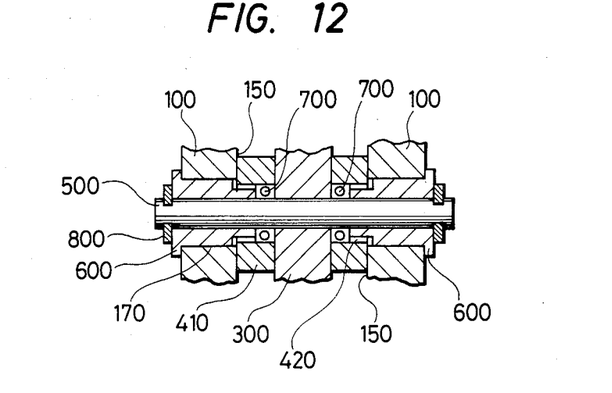
FIG. 12 is a cross-sectional view of a shaft portion.
Figure 13A:
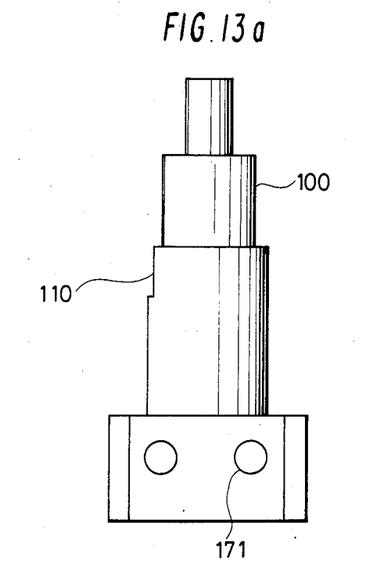
FIGS. 13a and 13b are, respectively, front view and a side view of parts of the cylinder.
Figure 13B:
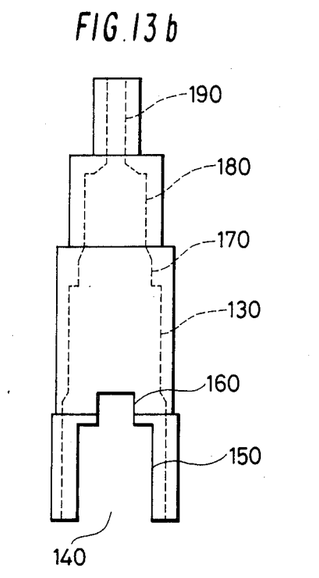
Figure 14A:
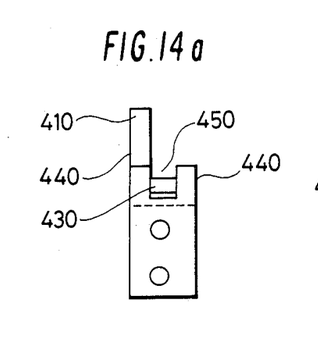
FIGS. 14a and 14b are, respectively, front view and a side view of parts of the slide pawls.
Figure 14B:
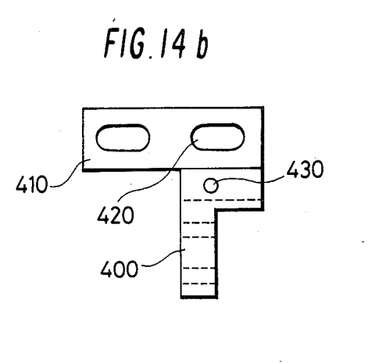
Figure 15:
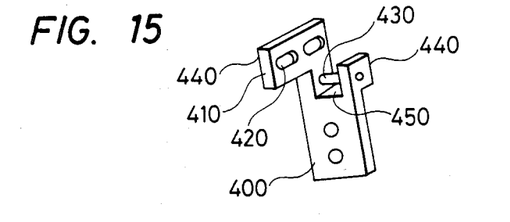
FIG. 15 is an outline diagram of the slide pawls.
Figures 16A, 16B:
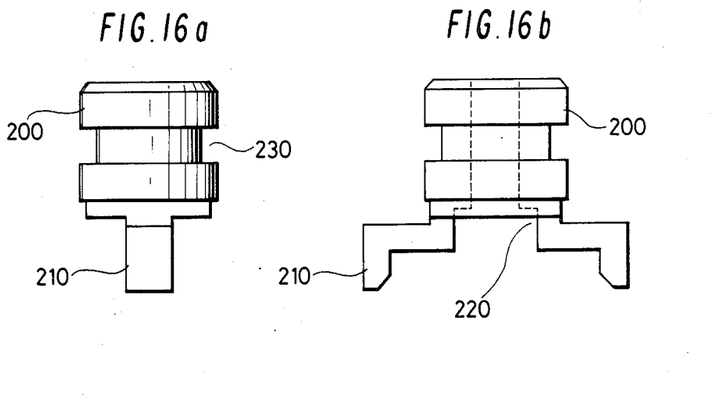
FIGS. 16a and 16b are, respectively, a front view and a side view of parts of the piston.

Holes 171 are formed in the cylinder 100 at opposite sides of the slot 140. Shafts 500, around which are fitted sleeves 600, pass through the holes 171, the shafts 500 being prevented from coming off by E-rings 800 at the opposite ends thereof. The action levers 300 are rotatably fitted onto corresponding ones of the shafts 500, and elongated guide holes 420 formed in the respective pawls 400 are slidably fitted onto respective ones of the shafts 500 through bearings 700 at the oposite sides of the respective action levers 300 (FIG. 12). Each of the action levers 300 is substantially traigularly shaped, and has one end 330 abutting the pressing member 210, a protrusion 320 abutting a tip end 910 of the piston 900 at the side opposite to the one end 330, and a lower slot portion 310 into which a pin 430 of the corresponding slide pawl 400 is fitted.

A slot portion 450 having the same width as the action lever 300 is formed at an upper center portion of each of the slide pawls 400, and the pin 430 is supported thereat. At the upper portion of the slide pawl on the one side there are formed biased reference members 410 in which the two guide holes 420, elongated in the sliding direction, are formed at the same interval as the spacing of the shafts 500.

The left and right slide pawls 400, which are commonly shaped, are arranged such that the respective reference members 410 are engaged with each other through the respective slot portions 450 at the opposite sides when they are set in opposition to each other (by rotation through 180 degrees). Each of the action levers 300 is rotatably mounted in the corresponding slot portion 450, and the pin 430 is fitted into the slot portion 310 of the action lever 300 so that the movements of the slide pawls 400 are interlinked with the rotation of the action levers 300.

When pressurized air is sent into the fluid path 190 and exhausted through the fluid path 110 (communicated with the atmosphere), the piston 900 is advanced in the first direction (downwardly in FIG. 9) and the slide pawls 400 are retracted through the action levers 300 to thereby open the slide pawls. Pressurized air is applied through the fluid path 110 and exhausted through the fluid path 190 (opposite the first-described case) so that the piston 200 is advanced in the first direction, and the piston 900 is retracted (the state shown in FIG. 9).

As the piston 200 advances, the pressing members 210 push the respective action levers 300 at their ends 330 to cause the action levers to rotate to thereby push the respective pins 430. The slide pawls 400 are guided by the bearings 700 fitted on the shaft 400, and the slide surfaces 440 are guided by the corresponding side surfaces 150 so that the pawls are closed in the direction of the elongated guide holes 420 (in a direction crossing the first direction) to thereby grasp an object.

To release the object, pressurized air is applied through the fluid path 190 and exhausted through the fluid path 110 to thereby open the pawl 400 in the manner described above.

Finger members (not shown) are provided for grasping the object, fixed on the slide pawls 400. The reason for using the V-shaped packing is to reduce the resistance against sliding. If an O-ring is used, the packing 950 of the groove 920 may be omitted.

Although a cylinder and a piston are used in the above-described embodiment, it is possible to use an arrangement where the pressing members are advanced by a solenoid, a motor, or the like, into a body substituted for the cylinder. Moreover, although the shaft 500 is fitted into the bearing to guide the elongated hole 420 of the slide pawl in the above-described embodiment, it is sufficient if the shaft 500 directly guides the elongated hole 420.

Figure 17:
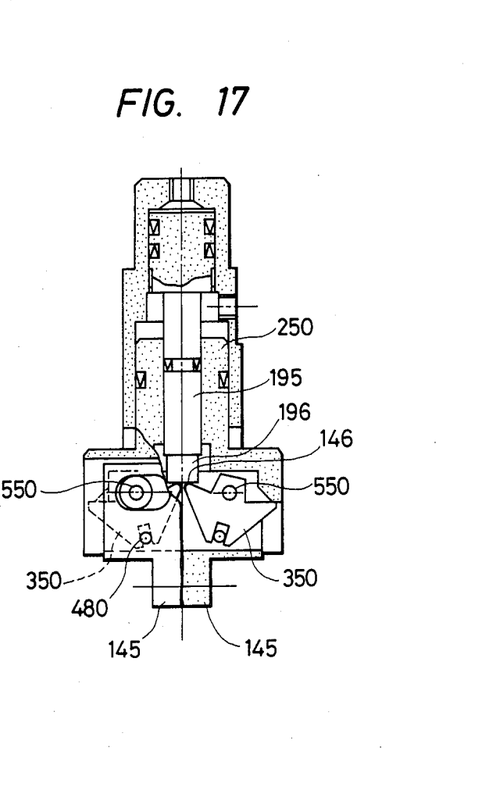
FIG. 17 shows a cross-sectional view of a third embodiment of a chuck of the invention showing the chuck in a closed state.
Figure 18:
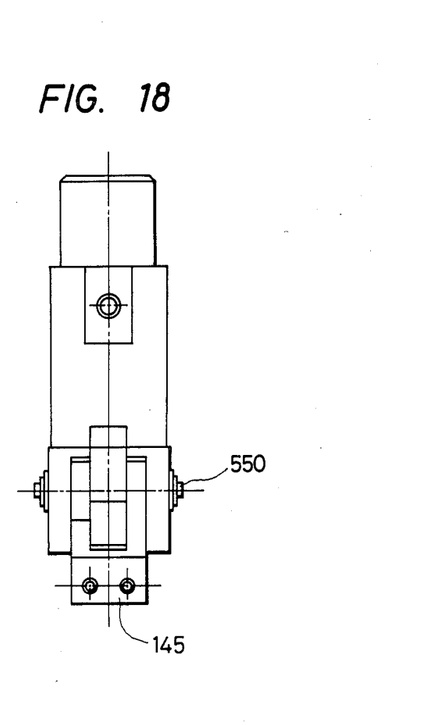
FIG. 18 is a side view of the chuck of FIG. 17.
Figure 19:
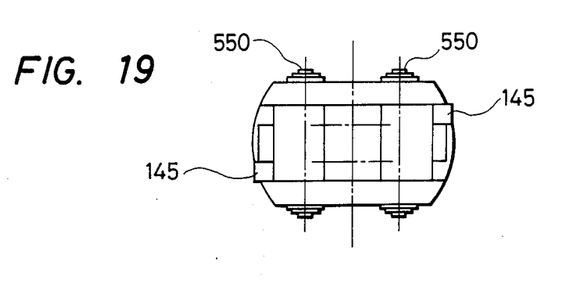
FIG. 19 is a bottom view of the chuck of FIG. 17.

A third embodiment of the invention, which represents a further modification of the second embodiment shown in FIGS. 9 through 16, is shown in FIGS. 17 through 19.

As shown in FIG. 17, in this embodiment, the diameter of the piston 195, and especially the tip end 196, are increased with respect to the embodiment of FIGS. 9 through 16. Also, the action levers 350 in this embodiment have generally an arrowhead shape. Lines joining centers of the shafts 550 and pins 480 are inclined inwardly towards the ends of the slide pawls 145. The action levers 350 are symmetrically shaped, with one side of the rear of each side of the tip 146 thereof being in abutment with the lower end of the piston 250 in the closed position of the chuck. The tip 146 of each action lever 350 has a rounded contact portion, as shown in FIG. 17, but the action levers 350 are so formed that they can be in surface contact with the tip end 196 of the piston 195 in the BDC (bottom dead center) thereof.

This third embodiment has the advantage that the contact between the tip end 196 and the action levers 350 can be made to be line contact rather than point contact. Also, the swing radius, defined by the point of closest contact between the tip end 196 and the action lever 350, can be increased, thus providing increased power to the slide pawls 145.

Thus, the invention provides a parallel chuck, and particularly a reciprocating parallel chuck, which is superior to the conventional chuck both as to its construction and operation since the number of parts is reduced and no guide bar and no slide groove are used. The inventive chuck has high accuracy because of the use of surface sliding members, and it is small in size and light in weight. Because the slide pawls are guided by two separated shafts, torsion is seldom caused in grasping an object. Moreover, in this regard, if a bearing is used, the load is received by rolling, and torsion can be completely eliminated.

In the preferred embodiment, the pair of slide pawls, the pair of shafts, etc., can be shaped commonly to each other, and fluid control such as pneumatic control, as is widely used for controlling chucks, can be employed.

Moreover, by employing two pistons and controlling the opening/closing of the chuck with a fluid pressure driving source, a heavy load can be manipulated in both the directions while a highly reliable operation is attained.

Further, because displacement of a piston (pressing member) is converted by rotation of an action member or lever to change the direction of action to thereby open/close the slide pawls, the efficiency in changing the directions is good and the grasping force is large, the maximum grasping force being about 1.5 to 2 times that of a conventional parallel chuck of similar size.

I claim:
1. A parallel type chuck comprising:
   a pressing member supported by a body slidably in a first direction;
   a pair of slide pawls facing each other and openable/closable by movement in a direction crossing said first direction;
   a spring for urging said slide pawls apart from one another;
   a pair of action members rotatably supported by said body and abutting said pressing member and engaged with said pressing member and respective ones of said slide pawls for transmitting displacement of said pressing member to respective ones of said slide pawls; and
   a pair of shafts provided on said body for guiding said slide pawls in corporation with respective fulcrums of said action members; and
   each of said pawls having a reference portion upwardly projecting in a biased manner, two elongated holes, and a slot portion at a center portion for receiving corresponding ones of said action members;
   said reference portion of one of said slide pawls, said action members, and said reference portion of the other one of said slide pawls being supported side by side on said shafts.
2. The parallel chuck according to claim 1, in which said body is a cylinder and said pressing member is a piston.
3. The parallel chuck according to claim 1 or 2, further comprising bearings fitted on each of said shafts in said elongated holes.
4. A parallel chuck comprising:
   a pressing member supported by a body slidably in a first direction;
   a pair of slide pawls facing each other and openable/closable by movement in a direction crossing said first direction;
   an urging member supported by said body slidably in said first direction and for urging said slide pawls apart from one another;
   a pair of action levers rotatably supported by said body and abutting said urging member and engaged with respective ones of said slide pawls for transmitting displacement of said pressing member and said urging member to said respective ones of said slide pawls; and
   a pair of shafts provided in said body for guiding respective fulcrums of said action levers and said slide pawls;
   each of said pawls having a reference portion upwardly projecting in a biased manner, two elongated holes, and a slot portion at a center portion for receiving a corresponding one of said action levers;
   said reference portion of one of said slide pawls, said action levers, and said reference portion of the other one of said slide pawls being supported side by side on said shafts.

5. The parallel chuck according to claim 4, in which said body is a cylinder, and each of said pressing member and said urging member is a piston.

6. The parallel chuck according to claim 4 or 5, further comprising bearings fitted on each of said shafts in said elongated holes.

7. The parallel chuck according to claim 4, wherein each of said action levers has the shape of a symmetrical arrowhead.

8. The parallel chuck according to claim 7, wherein each of said action levers is directed downwardly and inwardly towards a lower end of said slide pawls.

* * * * *